Patented Oct. 15, 1929

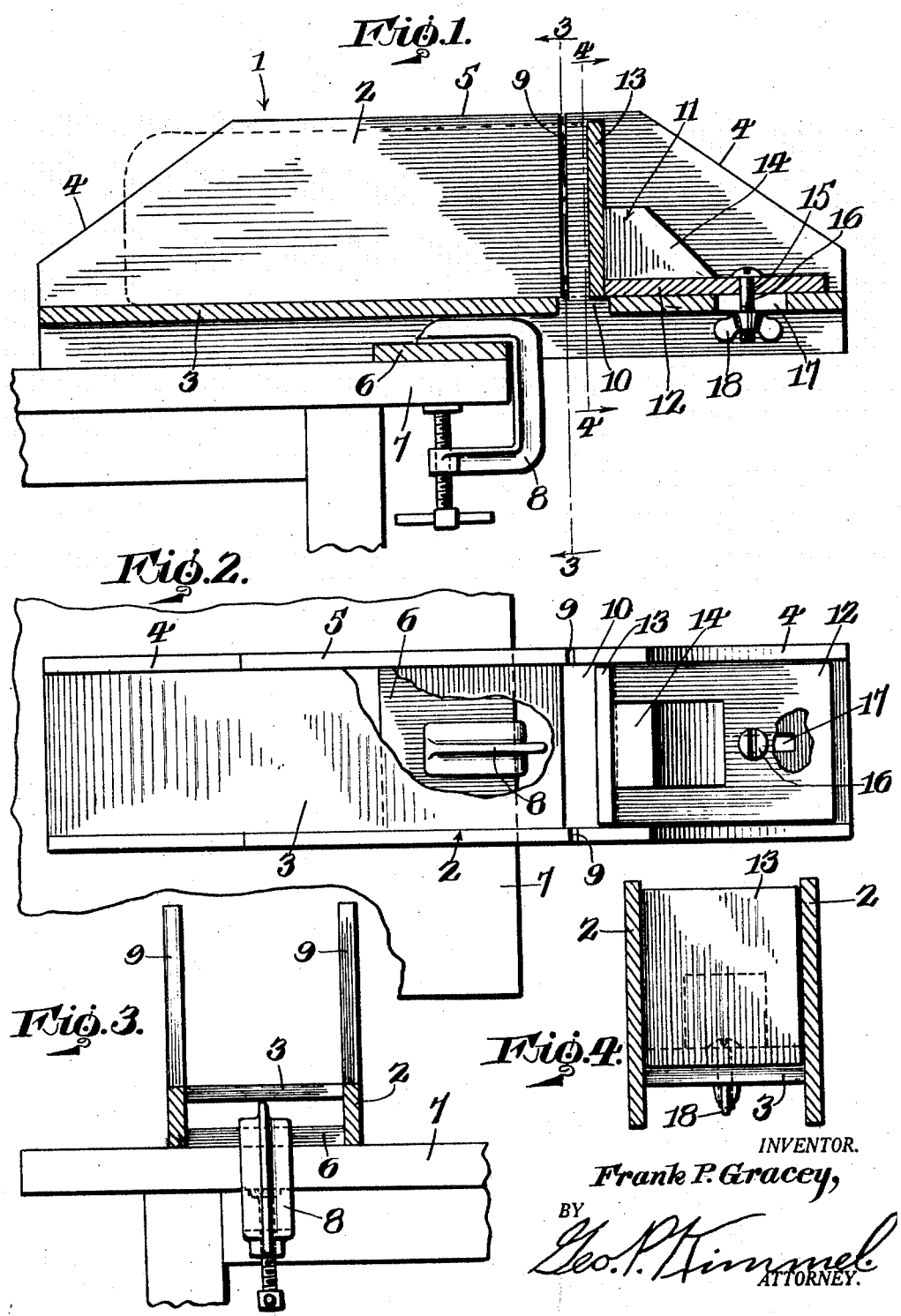

1,732,045

UNITED STATES PATENT OFFICE

FRANK P. GRACEY, OF AUGUSTA, GEORGIA

SLICING DEVICE

Application filed December 27, 1928. Serial No. 328,716.

This invention relates to a slicing device particularly adapted for use in slicing bread, but it is to be understood that the same may be used for slicing any article for which it is found to be applicable.

The primary object of the invention is to provide, in a manner as hereinafter set forth, a device whereby a loaf of bread may be effectively held to permit the same to be cut into slices of uniform thickness and whereby the thickness of such slices may be varied as desired.

A further object of the invention is to provide a device for the purpose aforesaid whereby a thickness of bread being sliced from a loaf may be firmly held in position until the slicing operation is completed, thereby permitting slices of extreme thinness to be severed from the loaf without any possibility of the slices crumbling or falling apart during the latter portion of the slicing operation.

A further object of the invention is to provide a device for the purpose aforesaid including a box-like structure for holding a loaf of bread while being cut into slices and provided with means for expeditiously removing the slices upon their severance from the loaf.

With the foregoing and other objects in view, the invention consists of the novel construction, combination and arrangement of parts as hereinafter more particularly described, and as illustrated in the accompanying drawing wherein is shown a preferred embodiment of the invention, but it is to be understood that such description and drawings are to be taken as illustrative and that the invention is intended to be limited only by the scope of the claims hereunto appended.

In the accompanying drawings in which like numerals are employed to designate like parts throughout the same:

Figure 1 is a longitudinal, vertical section through a slicing machine constructed in accordance with this invention showing the same secured in operative position upon a table.

Figure 2 is a top plan thereof partly broken away.

Figure 3 is a section taken on line 3—3 of Figure 1.

Figure 4 is a section taken on line 4—4 of Figure 1.

Referring to the drawings in detail, the numeral 1 designates generally a holding element consisting of a pair of spaced side members 2 and a bottom member 3 which is spaced from the lower edges of the side members 2. The side members 2 are preferably cut away at their forward and rearward corners as indicated at 4, whereby the tops 5 of the side members 2 are of materially less length than the length of the bottom member 3 and are disposed centrally with respect to the length of the latter. Midway between the ends thereof, the side members 2 have their lower edges rabbeted for the reception of a cross piece 6, the lower surface of which is flush with the lower edges of the side members 2. The cross piece 6 is adapted to seat on the edge of a support, such as a table indicated at 7, and is spaced from the bottom 3 in order that an arm of a clamping member such as 8 may be passed between the cross piece 6 and bottom 3 for the purpose of clamping the element 1 in position.

Spaced from the forward cut away portion 4, the side members 2 are formed with vertical slits 9 which are in alignment transversely of the element 1 and which extend from the upper edges 5 of the side members 2 to the bottom member 3. The bottom member 3 is formed with a transverse slot 10 which is of a length equal to the distance between the side members 2 and the rear wall of which is spaced slightly rearwardly from the slits 9. The slot 10 is of materially greater width than the slits 9 and the front wall thereof is spaced a substantial distance forwardly of the slits 9.

Adapted to be seated on the bottom member 3, between the forward end thereof and the slot 10, is a stop element indicated generally by the numeral 11 and consisting of a horizontal bottom member 12, a vertical rear wall member 13, and a reinforcing member 14 positioned within the angle between the members 12 and 13. The members 12 and 13 are preferably of a width slightly less than the distance between the side members 2 in order that they may freely slide therebetween, and the member 13 extends from the bottom member 3 to a point adjacent the top edges 5 of the side members 2. Forwardly of the reinforcing member 14, the bottom 12 of the stop element 11 is formed with an opening 15, for the reception therethrough of a bolt 16 which extends through a slot 17 formed in the bottom member 3 and extending longitudinally thereof. A wing nut 18 is threaded on the lower end of the bolt 16, by the manipulation of which the stop element 11 may be adjustably clamped to the bottom member 3. By loosening the wing nut 18, the bolt 16 may be moved longitudinally of the slot 17 in order to vary the positions of the rear wall member 13 with respect to the slits 9.

In the operation of my slicing device, the cross piece 6 is clamped to a support, such as the table 7, with the forward edge of the cross piece 6 flush with the forward edge of the support, in which position the slits 9 and slot 10 are projected beyond the edge of the support. The stop element 11 is then adjusted by means of the wing nut 18 so that the rear wall member 13 is positioned from the slits 9 a distance equal to the thickness of the slice which it is desired to cut. A loaf of bread or other article to be cut is then positioned in the holding element 1 and the forward end thereof is pressed firmly against the rearward face of the rear wall member 13 of the stop element 11. With the article to be cut thus firmly pressed against the stop element 11, a suitable cutting tool such as a knife is actuated within the slits 9 and the portion of the article being cut away by the cutting tool is held firmly in position so long as pressure is applied on the rearward end of the article being cut. After a portion of the article has been entirely severed, the article is moved slightly rearwardly which permits the severed portion to fall through the slot 10 into a suitable receptacle which may be placed beneath the slot for the purpose of receiving the severed portions.

It is thought that the many advantages of a slicing device in accordance with this invention will be readily apparent, and although the preferred embodiment is as illustrated and described, yet it is to be understood that changes in the details of construction may be made, which fall within the scope of the invention as defined in the appended claims.

What I claim is:

1. A slicing device comprising, a pair of spaced side members and a bottom member, and an adjustable stop element carried by the bottom member, said side members being formed with a pair of transversely aligned, vertical slits, said bottom member being formed with a transversely extending slot adjacent said slits for discharge of the sliced portions of an article, said slot being of a length equal to the space between the side members and being of substantially greater width than the width of said slits.

2. A slicing device comprising, a pair of spaced side members and a bottom member, and an adjustable stop element carried by the bottom member, said side members being formed with a pair of transversely aligned, vertical slits, said bottom member being formed with a transversely extending slot adjacent said slits for discharge of the sliced portions of an article, said slot being of a length equal to the space between the side members and being of substantially greater width than the width of said slits, said slot having its forward wall spaced from the vertical slits a materially greater distance than its rearward wall is spaced therefrom.

3. In a slicing device, a holding element including a pair of spaced side members and a bottom member, an adjustable stop element carried by the bottom member, said side members being formed with a pair of transversely aligned, vertical slits, said bottom member being formed with a transversely extending slot adjacent said slits, and means for clamping the holding element to a support with said slits and slot projecting beyond the edge of the support.

4. A slicing device comprising, a pair of spaced side members and a bottom member spaced from the lower edges thereof, an adjustable stop element carried by the bottom member, said side members being formed with a pair of transversely aligned, vertical slits, said bottom member being formed with a transversely extending slot adjacent said slits, and a cross piece secured to the lower edges of said side members in spaced relation to said bottom member.

5. A slicing device comprising, a pair of spaced side members and a bottom member spaced from the lower edges thereof, an adjustable stop element carried by the bottom member, said side members being formed with a pair of transversely aligned, vertical slits, said bottom member being formed with a transversely extending slot adjacent said slits, and a cross piece secured to the lower edges of said side members in spaced relation to said bottom member, said cross piece having its forward edge positioned between the rearward ends of the side members and the vertical plane of said slot.

In testimony whereof, I affix my signature hereto.

FRANK P. GRACEY.